(12) United States Patent
Bernard et al.

(10) Patent No.: US 10,598,200 B2
(45) Date of Patent: Mar. 24, 2020

(54) COMPOSITE TUBULAR STRUCTURE

(71) Applicant: Crompton Technology Group Limited, Shirley, Solihull, West Midlands (GB)

(72) Inventors: James Bernard, Brackley (GB); Ian Chase, Gloucestershire (GB)

(73) Assignee: CROMPTON TECHNOLOGY GROUP LIMITED, West Midlands (GB)

( * ) Notice: Subject to any disclaimer, the term of this patent is extended or adjusted under 35 U.S.C. 154(b) by 399 days.

(21) Appl. No.: 15/404,341

(22) Filed: Jan. 12, 2017

(65) Prior Publication Data

US 2017/0198734 A1    Jul. 13, 2017

(30) Foreign Application Priority Data

Jan. 12, 2016   (GB) .................................. 1600593.6

(51) Int. Cl.
*F16B 7/02*   (2006.01)
*F16B 7/18*   (2006.01)
(Continued)

(52) U.S. Cl.
CPC ............ *F16B 7/182* (2013.01); *B29C 53/566* (2013.01); *F16B 7/02* (2013.01); *F16C 7/026* (2013.01);
(Continued)

(58) Field of Classification Search
CPC .... F16B 7/02; F16B 7/18; F16B 7/182; F16B 9/02; F16B 9/05; F16B 9/054;
(Continued)

(56) References Cited

U.S. PATENT DOCUMENTS 2,848,133 A * 8/1958 Ramberg .............. B29C 53/602
                                                138/DIG. 2
3,721,134 A * 3/1973 Lamke ................... F16C 7/026
                                                74/586
(Continued)

FOREIGN PATENT DOCUMENTS

GB    1330313 A    9/1973
GB    2054083 A    2/1981
(Continued)

OTHER PUBLICATIONS

GB Search Report for Application No. GB1600593.6, dated Jun. 30, 2016, 4 Pages.

*Primary Examiner* — Daniel J Wiley
(74) *Attorney, Agent, or Firm* — Cantor Colburn LLP

(57) ABSTRACT

A composite tubular structure is described suitable for transmitting axial loads in compression or tension. It comprises an elongate composite member 70 having a nut 50 retained in each end for forming a connection with another component. The composite member further comprises an inwardly tapered section at each end, each of which has an inner surface that follows a tapered outer surface of one of the embedded nuts. The inwardly tapered section narrows the composite member in a longitudinal direction towards one end so as to provide a constriction which retains the respective nut within. A connector 80, 84, 86 may clamp the end with a pre-load. A liner 60 may be used to support the nuts during deposition of the filaments in order to form the two inwardly tapered sections at the ends. It can allow the wall of the structure to be formed with different profiles.

19 Claims, 7 Drawing Sheets

(51) Int. Cl.
  *F16C 7/02* (2006.01)
  *B29C 53/56* (2006.01)
  *B29K 23/00* (2006.01)
  *B29L 23/00* (2006.01)

(52) U.S. Cl.
  CPC ...... *B29K 2023/06* (2013.01); *B29K 2023/12* (2013.01); *B29L 2023/22* (2013.01); *F16C 2226/16* (2013.01); *F16C 2226/60* (2013.01)

(58) Field of Classification Search
  CPC .......... F16B 37/00; F16B 39/00; F16B 41/00; F16C 2226/16; F16C 2226/60; F16C 7/026; B29C 53/566; B29C 70/86; B29K 2023/06; B29K 2023/12; B29K 2023/22; Y10T 403/7069
  See application file for complete search history.

(56) References Cited

U.S. PATENT DOCUMENTS

| | | | | |
|---|---|---|---|---|
| 4,353,268 A | * | 10/1982 | Picard | B29C 33/52 74/587 |
| 4,411,114 A | * | 10/1983 | Wurtinger | F16C 7/026 403/267 |
| 4,652,171 A | * | 3/1987 | Schutze | B29C 53/70 403/205 |
| 4,848,957 A | | 7/1989 | Umeda | |
| 5,415,079 A | * | 5/1995 | Ching | B29C 63/10 92/169.2 |
| 6,379,763 B1 | * | 4/2002 | Fillman | B32B 1/08 138/121 |
| 9,056,431 B2 | * | 6/2015 | Bond | B29C 70/30 |
| 2012/0060636 A1 | * | 3/2012 | Dewhirst | F16C 3/026 74/473.36 |
| 2012/0125146 A1 | | 5/2012 | Boveroux et al. | |
| 2017/0051767 A1 | | 2/2017 | Giannakopoulos | |

FOREIGN PATENT DOCUMENTS

| | | |
|---|---|---|
| GB | 2247930 A | 3/1992 |
| GB | 2276690 A | 10/1994 |
| GB | 2281545 A | 3/1995 |
| GB | 2454958 A | 5/2009 |
| WO | 2009066070 A1 | 5/2009 |

* cited by examiner

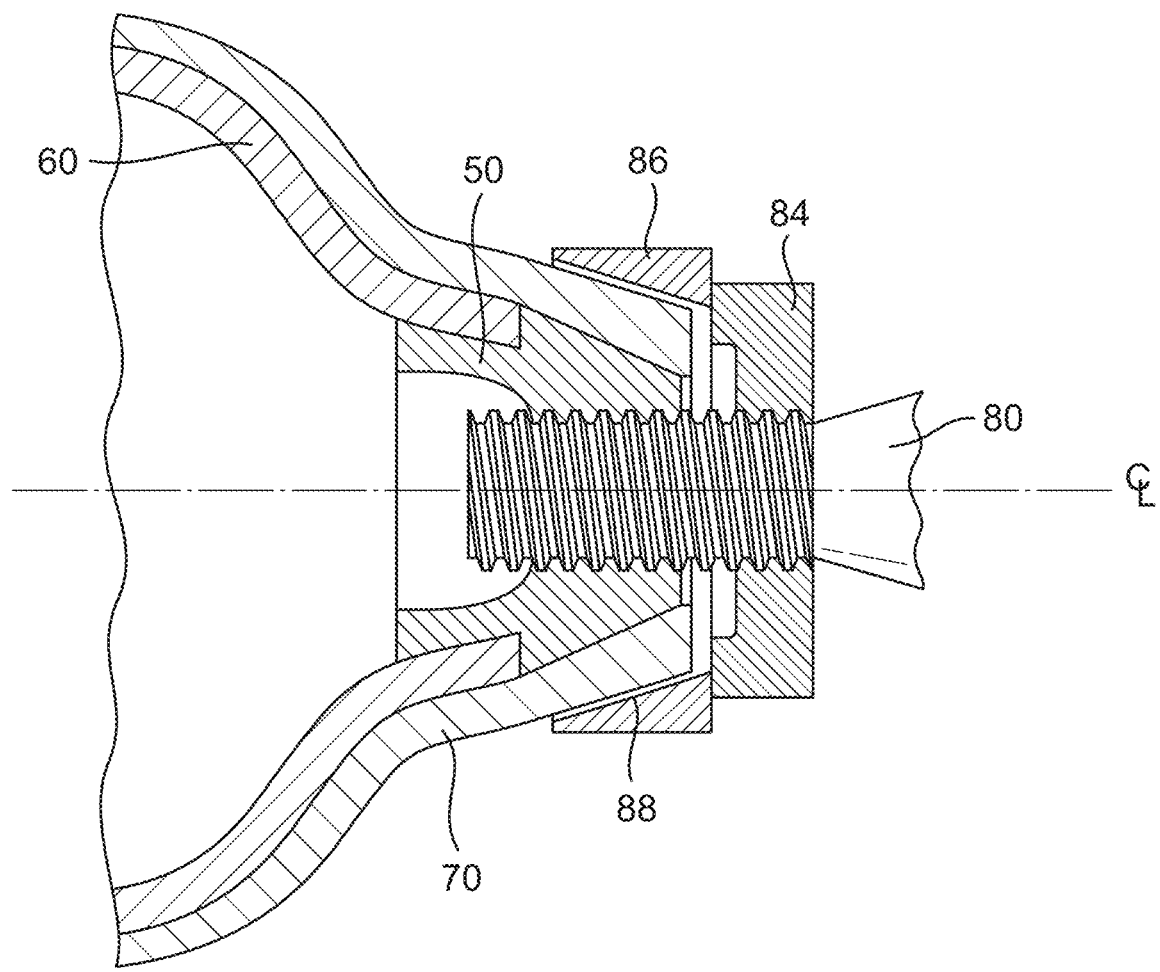

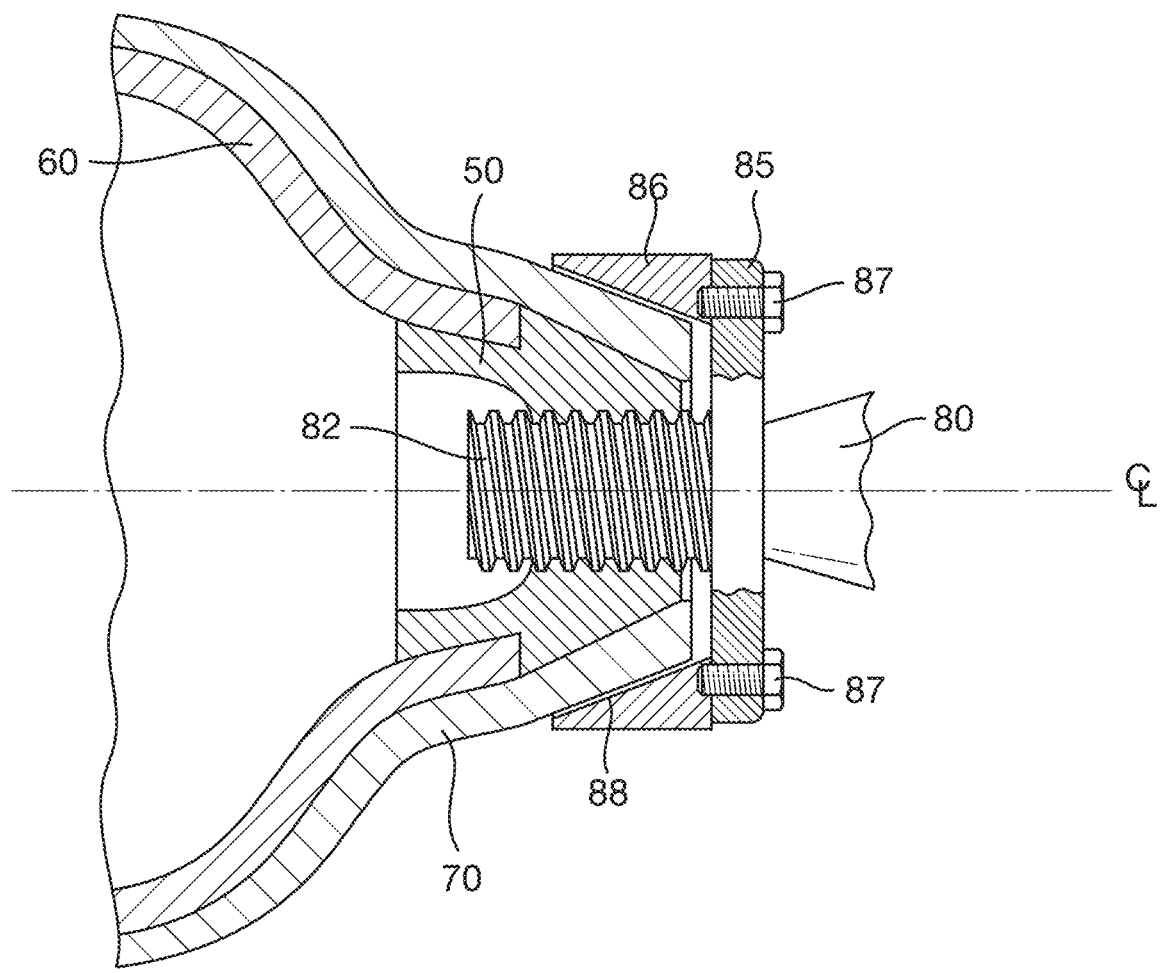

COMPOSITE TUBULAR STRUCTURE

This application claims priority to United Kingdom Patent Application No. 1600593.6 filed Jan. 12, 2016, the entire contents of which is incorporated herein by reference.

TECHNICAL FIELD

The disclosure relates to a composite tubular structure, in particular comprising a composite member with an embedded nut at each end for forming a connection to another component, and a method of manufacturing the composite tubular structure.

BACKGROUND

Composites are becoming more widely recognized as a viable solution to a range of applications due to their inherent strength to weight ratio. Composite tubular structures are currently employed in many fields such as the motor sports, marine, aerospace and medical fields. In use, these structures may be subjected to axial tensile and compressive loads as well as bending and torque loadings, for example, when used to provide rods or struts. With increasing demand to transmit working loads directly through to the composite tubular structure comes a requirement also to provide a suitable end fitting or connector arrangement.

A known composite tubular structure and connector arrangement is disclosed in WO 2009/066070. The connector comprises an embedded ovoid screw-threaded nut which creates a bulge in the overlying filaments of the composite member, and an annular wedge for placement over the nut and composite material. The outer surface of the nut produces a region where the filaments flare radially outward and then inward to form the bulge. This provides a tapering surface against which the nut and an annular wedge can be urged to exert a clamping load on the composite material between.

In WO 2009/066070, the ovoid nut can produce residual stresses in the structure during the curing process, as well as having a negative effect on manufacturability due to filament placement and angles. Additionally, if the slope of each side of the nut is at an angle θ relative to a longitudinal axis of the composite tubular structure, then the load being carried by the filaments needs to be transmitted through an angle of 2θ at the point where the angle changes between the two slopes (i.e. at the widest extent of the bulge). This can result in a region where stresses are concentrated and potentially this can limit the overall axial loads (tension/compression) which may be safely carried by the tubular structure.

In Greek Patent Application No. 20150100371, a tubular structure is described which uses the connection system of WO 2009/066070 at one end and a narrower connection system at the other having a radially inward tapered section to retain a nut. The nut for the narrow end of the tubular structure can be fed through from the opposite end which has a larger internal diameter. Weight savings have been made through this arrangement due to one end having a smaller diameter. In addition, while tests have shown that the new connection system offers axial strength benefits, because the deflection angle of the filaments in the tapered section at the narrower end is less, the axial design loads of the tubular structure as a whole are limited by the capabilities of the axially-weaker connection.

U.S. Pat. No. 4,848,957 describes a connection system for a plastic composite tube where a series of acute angled cutouts are provided in the end of the tube to allow the end to be closed down into an inwardly tapered shape once a nut has been introduced. GB-A-2247930 describes a similar arrangement where in place of the acute angled cutouts, an array of axial slots are cut in the end of the tube allowing the parts of the end of the tube to converge, thereby providing inwardly tapered sections at each end. These arrangements would have limited axial load transmission properties due to the way that the ends are formed.

US-A-2012/125146 describes a composite rod having a pair of tapered metal end-pieces that attach to an inner tube. The arrangement is then embedded within wound filaments to form an outer layer which is then polymerised to form the tubular composite structure comprising the inner and outer layers. A rod end can then be screwed into a thread located in a nose of the tapered metal end-piece for connection to another component.

There is a desire to, where possible, reduce the weight of the connector and composite tubular structure, simplify manufacture of the components and design them so they can be used in many different applications.

Further, with increasing demand for lightweight tubular structures, there arises a need to design such structures which can bear the loads more efficiently for a given weight.

SUMMARY OF THE DISCLOSURE

According to a first aspect of the invention, there is provided a composite tubular structure comprising an elongate composite member having a nut retained in each end for forming a connection with another component, wherein the composite member comprises an inwardly tapered section adjacent each end, each inwardly tapered section having an inner surface which follows a tapered outer surface of one of the embedded nuts, the inwardly tapered section narrowing the composite member in a longitudinal direction towards one end so as to provide a constriction which retains the respective nut within.

The inwardly tapered section at each end of the structure allows a nut or annular wedge to be placed over its outer surface and tightened until a snug fit is achieved to allow a good transmission of loads.

The inwardly tapered sections at both ends of the tubular structure can result in reduced weight due to the smaller diameter of (and hence reduced mass of) both ends, in particular the smaller diameters of the embedded nut and an outer wedge of a connector. Additionally, the maximum angle of deflection in the filaments at both ends is only θ, where θ is the angle of taper (rather than 2θ at one or both ends, e.g., with the embedded ovoid nut arrangement of WO 2009/066070), improving strength capability in the axial direction.

The elongate composite member can be formed by filament winding. The filaments forming the inwardly tapered sections may be continuous and helically-wound. Thus the wound filaments may form the truncated cone shape of the inwardly tapered section. The inwardly tapered sections are continuous in the circumferential direction (e.g., in contrast to the acute cutouts of U.S. Pat. No. 4,848,957 and slits of GB-A-2247930 that are provided to allow a nut to be introduced after the tube has been formed but before the taper is formed). Accordingly the composite tubular structure can be made to have good axial load transmission properties in both tension and compression, in particular along the length of the inwardly tapered sections, because of their continuous structure.

The filaments may also be deposited by other production methods, for example, as part of a braiding process, or deposited through other filament placement processes, prepreg wrap processes or any other method of composite manufacture. The filaments may be deposited by a combination of any such deposition processes.

Layers of filament windings may be laid down at different winding angles to transmit axial loads and possibly torque according to design requirements. The layers may also include hoop wound filaments for resisting internal or external pressure. The elongate composite member may be a unitary structure comprising a main body portion and the inwardly tapered sections for transmitting forces from one end to the other as a monocoque structure.

The inwardly tapered sections may each have a taper angle of between 5 to 25° relative to an axis of the composite tubular structure, i.e., it is a relatively shallow angle of taper. The range of taper angle may be greater than or equal to 8° and/or less than or equal to 15° relative to an axis of the composite tubular structure. This allows a good transmission of, in particular, axial forces through the connection.

The elongate composite member of the structure may be configured so as to provide a main body portion between the two inwardly tapered sections. The composite tubular structure may have rotational symmetry about a longitudinal axis, to define an internal radius (ri), an outer radius (ro) and a wall thickness (w=ro−ri) of the composite member along its three various sections: the two inwardly tapered sections and the main body portion between.

The wall thickness of the composite member in the inwardly tapered sections (the wall thickness of the filament windings and resin matrix) may be the same or greater than in the main body portion. In this way there is a significant concentration of filaments, e.g., in the form of filament windings, able to transmit the axial loads (and where necessary torque) in the tapered sections through to the connector as compared to the main body portion, e.g., in contrast to US-A-2012/0125146 where the main body portion comprises the two layers of an inner body and an outer body and the inwardly tapered sections each comprise just the outer body layer. The wall thickness of the inwardly tapered sections may be greater at the open, narrower end than at the end adjacent the main body portion.

The composite tubular structure may comprise a rod or a strut. It may be for an aircraft. For example, it may have application as a hydraulic actuator, a drive shaft, part of a landing gear, etc. However it could also have applications in automotive and marine technical areas. The composite tubular structure may be for transmitting significant axial forces, e.g., tensile or compressive loads, and may have to resist snapping or buckling. It may also have to transmit angular (i.e. non-axial) forces and be able to resist bending forces created through side loads resulting in axial tensile and compressive loads. It may include a rod end or a clevis for connection to another component.

The main body portion may be of constant internal radius. By comparison, the inwardly tapered sections have a progressively changing internal radius that is less than or equal to the internal radius of the main body portion, (i.e., it satisfies the rule: rtapered section≤rmain body, where rtapered section and rmain body are the internal radii of the inwardly tapered section at any given point along the section and the main body respectively).

Alternatively the main body portion may vary in internal radius in the longitudinal direction. For example, the internal radius of the main body portion may increase in the longitudinal direction from one end to the other. In another example, the radius of the main body portion increases in the longitudinal direction from each end of the composite member towards its middle. In both examples, each inwardly tapered section has a progressively reducing internal radius that may be less than or equal to the internal radius of the adjacent main body portion, (i.e., it satisfies the rule rtapered section≤rmain body, where rtapered section is the internal radius of the inwardly tapered section at any given point along the section and rmain body is the minimum main body radius adjacent the inwardly tapered section).

An increasing radius along the axis may be useful in a cantilever beam, for example, the loading of which would ideally require a wide root and a progressively narrower free end. In a strut or rod, the radius can be made to increase from either end along the main body portion to the middle, forming a "lemon-shape" or similar convex shape where greater resistance to buckling can be provided by the wider mid-structure.

By varying the radius, the tubular structure can be adapted for improved support against buckling under heavy loads or in bending. The bending stiffness of a structure is proportional to I, the second moment of area. A formula for the second moment of area of a cross section is given by (in polar coordinates):

$$I = \int_A r^2 \, dA$$

where:
I is the second moment of area (given in units of length$^4$)
A is the area of the cross section
r is the distance from a reference axis
For a hollow circular cross section, the formula for the second moment of area is given by:

$$I = \int_{\theta=0}^{\theta=2\pi} \int_{r=r_i}^{r=r_o} r^2 (r \, dr \, d\theta) = \frac{\pi}{2}(r_o^4 - r_i^4)$$

where
$r_o$ represents the outer radius of the cylinder and
$r_i$ represents the inner radius of the cylinder.

Thus it is clear that to achieve the same second moment of area I as one tubular structure, another tubular structure with a larger diameter (but smaller wall thickness ($t=r_o-r_i$)) can be used. A difference in weight savings can be automatically realised, since weight is proportional to area and the area of a hollow circular cross-section is given by:

$$A = \pi(r_o^2 - r_i^2)$$

Thus for an increase in radius of the tubular structure, the second moment of area increases by a fourfold amount, as compared to the mass which increases by a squared amount. Accordingly, a significant weight saving can be achieved by correct design of the tubular structure to the appropriate bending moment which it is predicted to experience.

For example, a cantilevered tubular structure will require a cross section having larger inner and outer diameters closer to its root, and smaller inner and outer diameters close to its tip.

As another example, the Euler buckling load for a thin strut is proportional to the second moment of area I. Thus, for a given length of strut, by increasing the diameter of the cross sectional area, the load at which the strut will buckle will increase, thereby providing a stiffer, lighter tubular structure. Therefore, by varying the diameter along the length of the tubular structure, the resistance to buckling can be optimised for a given weight of material.

The composite tubular structure may have a wall thickness which varies in the longitudinal direction. A thinner wall may be used where the radius of the tubular structure is larger, compared to a thicker wall where the radius of the tubular structure is smaller.

As described above, if the tubular structure has larger inner and outer radii and therefore larger inner and outer diameters, then less wall thickness t is necessary to achieve the same stiffness in bending. Accordingly, a thinner wall can be used, which also results in a much lighter-weight structure.

The composite member of the tubular structure may be formed around a liner. The liner may comprise a range of possible materials that provide a substrate for the filaments to be wound around. The liner may be a different material to that of the composite member. The liner may be a light-weight material, e.g., less dense than the material of the composite member it is used to support. The liner material may be deformable, for example, through the application of pressure and heat, so that it can be moulded to different profiles. In one example the liner is a polymer material, such as polypropylene or polyethylene.

The shape of the liner may be chosen to optimise the shape and thus the load bearing capability of the composite member because the inner surface of the composite tubular structure takes the shape of the outer surface of the liner. Thus the liner may be pre-formed with an outer radius that varies with longitudinal distance along a liner axis. The liner may be pre-formed, e.g., blown out and/or moulded, assembled, etc., with a middle region having a larger outer radius compared to the liner ends. In another example, the liner may have a larger outer radius at one end compared to the other. This may be in addition to a middle region of the liner having been expanded or simply being larger than the other end of the liner. In another example, the liner may be formed so as to have a longitudinally asymmetric, but axisymmetric, profile along its length.

The liner may assist with holding the nuts in place during the winding and curing process.

Together with the nuts, the liner may maintain a sealed environment within the tubular structure during the processing. An internal pressure can be maintained (or raised during the processing) within the liner, e.g., to provide resistance to the winding forces to maintain dimensions and/or to maintain dimensions during the curing process.

The assembly of the nuts and liner may be supported during the winding or other filament deposition operation by two portions of a mandrel, one disposed at each axial end of the liner, the mandrel engaging the nuts and being provided with a seal to prevent resin from blocking the threads.

The liner may be subsequently removed by melting, dissolving, burning or another material removal process. The material of the liner can be drained or otherwise extracted through one of the nuts in the end of the composite tubular member. It may be fully-removed or partially removed.

The liner could also be peeled out from within the composite tubular structure, it could be unraveled or it could be broken up in some other way in order to allow the liner to be removed. For example, the liner may be removed by degradation using UV light or other trigger source.

Removing the liner will reduce the weight of the final product (the composite tubular structure) by an amount equal to the mass of liner material removed.

Alternatively, the liner may be retained, and may remain intact within the tubular structure. The retained liner may continue to provide support to the embedded nuts or to the wall of the composite member during subsequent processing or during attachment (or reattachment) of connectors to form suitable end fittings. The retained liner may be impervious to fluid. The retained liner may be electrically conductive.

Thus leaving the liner in place within the tubular structure can add a function to the final composite tubular structure, the additional functionality compensating for the slight weight penalty (the liner may add little or no additional strength benefit to the composite member but will add some weight to the structure).

During attachment of the connectors, the liner may lock the embedded nuts in place at each tapered end of the tubular structure, preventing the nuts from becoming detached from the tapered sections. The liner may provide a mechanical engagement with the embedded nut, preventing slippage and rotation of the nut while a connector is secured in place (i.e. when a tensioner is connected to the nut). This might be achieved, for example, by providing the liner with formations around its circumference where it abuts against the nut. The nut, having opposite formations (i.e. configured to interlock with the liner formations), could then be locked firmly in place by the liner so that during the process of attaching a connector, the nut does not have to rely merely on the bond strength between the cured composite to resist the rotational forces from screwing in the parts of a connector; it can also be locked to some extent by the liner. By way of example, one or more teeth could be provided on the liner or nut, for engagement with hollows disposed in the nut or liner respectively.

When a liner is not used, a separate process control stage may be required in the production process to ensure that the nuts are securely bonded to the composite member before a connector is attached (since if a nut were to come loose, it may become lost within the body of the composite tubular structure). The nuts may have to undergo a surface preparation stage, for example, where they undergo shot peening to add surface texture/roughness, cleaned and/or primed before they are embedded in the composite member, in order to ensure adequate bonding with the composite tubular structure. However, with the addition of a liner, it may be possible to avoid such a process control stage altogether while ensuring the nuts remain in place (by interlocking with the liner) for the process of attaching the connector.

As another example, the liner may be impervious to fluid, so could contain fluid, and/or act as a conduit for fluids. Thus the liner may contain a pressurised fluid allowing the tubular structure, for example, to resist certain buckling forces and impact damage during use or fabrication of a structure, in conjunction with which it is to be used. The tubular structure could provide a reservoir or a conduit for fluids, for example, hydraulic fluids or coolants. The retention of a fluid in the form of a gas may be useful for increasing buoyancy. An impervious liner could also be pressurised during winding and/or curing of the composite tubular structure to ensure the final shape of the composite tubular structure. This may also allow a thinner, less-stiff liner to be used, which would also be lighter in the final product where it is retained.

As a further example, the liner may be made of metal or other conductive material and so may provide a conductive path for electricity. This may, for example, be used to ground components, to convey electrical signals and/or to provide lightning strike protection.

The liner may also provide other advantageous structural and/or material properties that are supplementary to the inherent properties of the composite member.

Thus according to the present disclosure, from a second aspect there is also provided a composite tubular structure which comprises a liner and a composite member that has been formed around the liner, the liner being retained after curing of the composite member and providing additional functionality to the composite tubular structure in service wherein: the liner locks the nuts at each end of the liner against rotation; and/or the retained liner is impervious to fluid; and/or wherein the retained liner is electrically conductive.

The composite tubular structure according to this aspect may have inwardly tapered sections at its ends. There may be an embedded nut disposed at both inwardly tapered sections of the composite tubular structure, the nuts being formed with tapered outer surfaces around which the filament(s) of the composite member are deposited, e.g., by filament winding or another filament or tow deposition operation. The tapered outer surface of the nut may be located radially outward of a threaded portion which secures to a rod of a connector. The liner may be pre-formed to have an outer radius which varies along its length to impart changes in internal radius of a main body portion along the length of the composite tubular structure. Indeed the composite tubular structure may comprise any of the optional features mentioned above.

The composite tubular structure may include a connector comprising a rod engaging one of the nuts, the engagement occurring within the inwardly tapered section, an annular wedge configured to urge against an outer surface of the inwardly tapered section, and a tensioner provided to exert a clamping force on the inwardly tapered section via the annular wedge. The connector of this and the previous aspect may be pre-loaded with a clamping force exerted by the tensioner before the composite tubular structure is put into service. The clamping force may be set to exceed an expected axial compressive or tension load during service.

According to another aspect of the invention there is provided a method for manufacturing the composite tubular structure, comprising depositing filaments or tows of filaments around a liner to form an elongate composite member; the method further comprising supporting a nut at each end of the liner and depositing filaments or tows around the liner and the nuts combined to embed the nuts within the ends of the composite member to form the tubular structure.

By depositing filaments or tows around both of the liner and the nuts, for example, during a winding operation, the nuts (and their screw thread) become embedded, or enclosed, within the tubular structure. The nuts may have a tapered outer surface which forms a tapered section at each end of the tubular structure, the tapered sections narrowing towards an end of the tubular structure to provide a constriction to retain the nut (and the screw thread) within. This use of a liner avoids the problem of how to insert a nut into a tubular structure where the nut has a maximum outer radius which is larger than the inner radius of an opening at one end of the composite member.

Any or all of the previous features mentioned above may be used in accordance with this aspect.

As described above, the liner may be attached between two sections of a mandrel for performing a filament winding process or other filament or tow deposition process. Each section of the mandrel may further comprise: an inward radial step at an area where an end of the composite member is intended to be formed, such that a portion of the mandrel section which extends away from the liner has a larger diameter and a portion of the mandrel which is adjacent the respective nut has a smaller diameter; and an annular sacrificial layer of material is disposed about a part of the smaller diameter portion of the mandrel; wherein once the filament deposition process has been completed and the mandrel is to be removed, a cut is made through the tubular structure and into the sacrificial material layer in a radially inward direction to form an end of the tubular structure, and the mandrel sections are removed.

The use of the mandrel allows the liner to be spun while the filaments or tows are being applied to the liner. A seal may be provided between the nuts at the ends of the liner and the respective section of mandrel to prevent ingress of resin into the composite member during processing. In this way, screw threads or other formations provided in the nuts for connection to a rod of a connector can be maintained free of resin. The liner may be of an impervious material and together with the nuts, define an enclosed space which can be pressurised during the filament or tow deposition and/or curing process to maintain production dimensions.

The end of the finished composite member may correspond to an end surface of the embedded nut. In other words, the end of the composite member may comprise an annular surface extending in a radial direction between the inner and outer surfaced of the inwardly tapered section.

The method may further comprise machining the outer surface of the tubular structure to prescribed dimensions.

The composite tubular structure may be provided with a connector at one or both ends.

The connector may comprise a rod which is configured to be secured within one of the embedded nuts. The rod may comprise a screw thread which engages with a corresponding screw thread of the embedded nut. The rod and the nut may engage one another in a location within the inwardly tapered section that provides the constriction to retain the nut.

A wedge or other arrangement for pre-loading in compression may have been fitted over the outer surface of the inwardly tapered section. The inwardly tapered section may be clamped under pressure between the wedge and the nut. A pre-load in through thickness compression may have been set by tightening the wedge with respect to the nut. An outer nut urging the wedge towards the embedded nut may provide the pre-load. In another example, a PCD of bolts may be used to drive the wedge into the outer surface of the inwardly tapered section.

Thus the method may also comprise slotting an annular wedge having a tapered inner surface onto a rod which engages a nut of the composite tubular structure. The tapered inner surface of the annular wedge may lie parallel to, and against, an outer surface of one of the inwardly tapered sections of the tubular structure, clamping the composite material between the nut and the annular wedge.

The method may include setting the connector with a preload which exceeds the expected axial loads for the composite tubular structure during service.

Through this the composite tubular structure may be clamped securely and snugly between the embedded nut and the annular wedge on the rod without movement when axial loads are experienced during service. The ability to finish the surface of the tapered composite tubular structure by machining allows the surface to be optimised for a good fit for joining and thereby prevent occurrence of localised stresses due to surface roughness of misshapenness.

BRIEF DESCRIPTION OF THE DRAWINGS

Various embodiments of the invention will now be described with reference to the following description and drawings by way of example only, and with reference to certain figures, wherein:

FIG. 8 shows a longitudinal cross-section of a composite tubular structure comprising a liner;

FIG. 9a shows a longitudinal cross-section of a composite tubular structure comprising a liner, illustrating an example of a formation that may be provided at an end of a retained liner, the structure having a taper of constant wall thickness;

FIG. 10b shows a nut having projecting portions for interlocking and rotation-resisting engagement with the liner of FIG. 10a.

DETAILED DESCRIPTION

Figure 1:
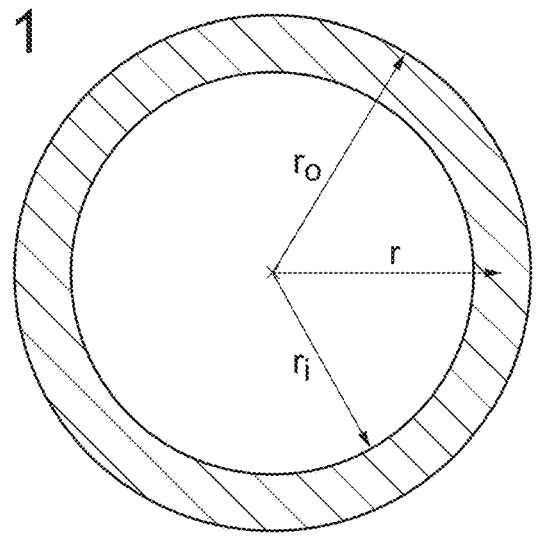
FIG. 1 schematically depicts a cross section of a tubular structure showing inner, outer and positional radii.

As can been seen in FIG. 1, there is depicted a cross section through a tubular structure having an inner radius ri, an outer radius ro and a radial distance r from the central axis. It is these dimensions which are used in the formula for the second moment of area I of a cylindrical cross section:

$$I = \int_{\theta=0}^{\theta=2\pi} \int_{r=r_i}^{r=r_o} r^2 (r dr d\theta) = \frac{\pi}{2}(r_o^4 - r_i^4)$$

and for the area A of the cross section:

$$A = \pi(r_o^2 - r_i^2)$$

Figure 2A:
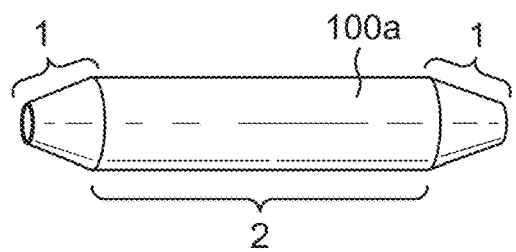
FIG. 2a shows schematically a composite tubular structure having a cylindrical main body portion with a constant radius.
Figure 2B:
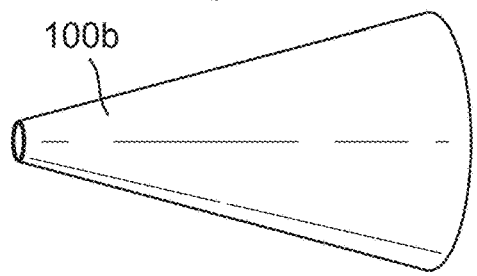
FIG. 2b shows schematically a composite tubular structure having a conical main body portion with an increasing radius in the axial direction from one end to the other.
Figure 2C:
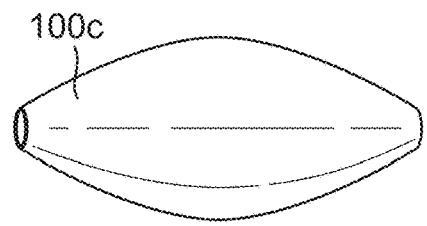
FIG. 2c shows schematically a composite tubular structure having a convex main body portion ("lemon-shaped" main body portion) with an increasing radius in the axial direction from each tapered end.

FIGS. 2a-c depict several embodiments of a composite tubular structure 100a, 100b, 100c, each having a pair of inwardly tapered sections 1 and a main body portion 2 provided by a composite member 3. Tubular structure 100a has a cylindrical main body portion of uniform radius, tubular structure 100b has a conical main body portion 2 (exaggerated in the figure) where the radius increases along its axis from one inwardly tapered section 1 to the other, and tubular structure 100c has a convex main body portion 2 (exaggerated in the figure) where its radius increases from each inwardly tapered section 1 towards the centre of the main body portion 2 to define the convex shape (referred to as "lemon-shaped", though in most instances will be comparatively much longer and less distorted in terms of the increase in radius than shown in the figure).

Other shapes are also contemplated, such as tubular structures with staged regions of different radius, convex structures with opposing conical portions, convex structures with a more elliptical profile than shown in FIG. 2c, non-symmetrical structures, etc. and are included within the present disclosure.

The internal radius may increase over the length of the main body portion 2 by more than 3%. It may be more than 5%, or 10% or more. For most practical situations, the maximum internal radius of the main body portion 2 may be less than 50% larger than the minimum internal radius. The percentage increase may be 40% or less, in some cases 34% or less, e.g. 25% or less.

As described above, by designing a variation in the cross section of the composite tubular structure 100b, 100c, an optimised configuration can be achieved to support the specific loads that are to be applied with a lighter-weight structure.

Figure 3:
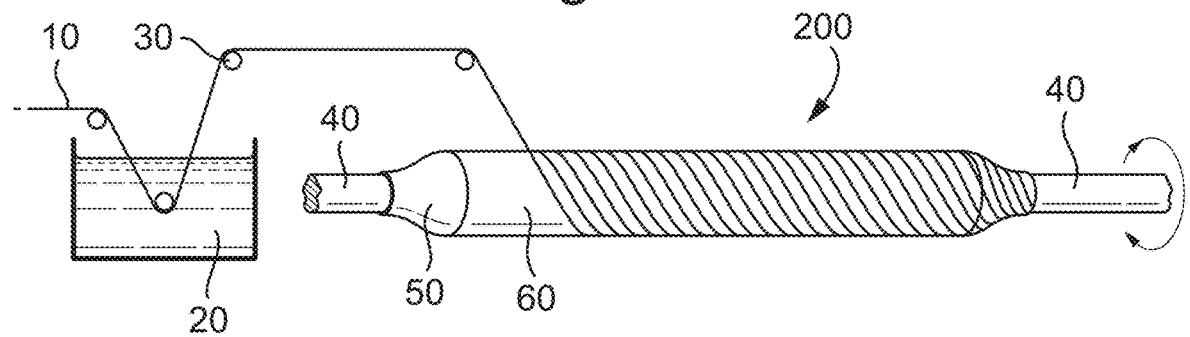
FIG. 3 shows schematically a filament winding process for forming a composite tubular structure.

FIG. 3 schematically shows an example of a wet filament winding process for forming a composite tubular structure 200. Filaments 10, for example, in the form of a tow or part-tow, are passed over rollers 30 through a solution of resin 20 which will form the matrix. Further rollers 30 direct the filaments 10 for winding onto the workpiece. The workpiece comprises a two-piece mandrel 40 to which is mounted a liner 60 having an embedded nut 50 at either end of the liner 60. The matrix-soaked filaments 10 are then wound onto the mandrel 40, nuts 50 and liner 60 which are rotated by the mandrel 40. In FIG. 3, the direction of rotation of the mandrel is shown schematically by the arrow. In practice, multiple layers of filament windings will be built up to form the composite member, the layers of varying in winding angle and/or direction and/or filament specifications to tailor the properties of the composite member for its intended purpose and expected loadings.

In some embodiments (not shown), the filament winding process is a dry process and the resin is added later, with curing taking place under pressure and in a vacuum (Resin Transfer Moulding—RTM).

Figure 4:
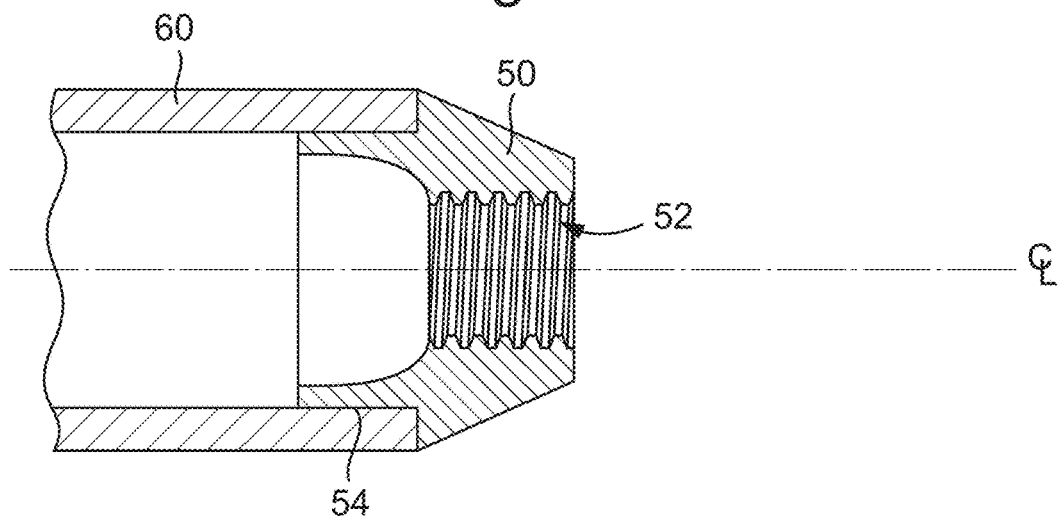
FIG. 4 is a longitudinal cross section showing a liner and an embedded nut.

FIG. 4 depicts a close-up longitudinal cross section of an end of a workpiece with the mandrel 40 omitted, showing a liner 60 and a nut 50 which is to be embedded having an internal screw thread 52, disposed about a centre line. The nut 50 includes a step 54 to receive an end of the liner 60. The step 54 and the internal diameter of the liner 60 may be sized to provide a friction fit. Additionally or alternatively, an adhesive or sealant may be applied to join the respective surfaces. The nut 50 may also be provided with a flared internal region 56 as shown to reduce the weight of material in the nut 50 while still adequately supporting the connection with the liner 60.

The nut 50, in place of the internal screw thread 52 may comprise an alternative female structure for securing a rod to the nut, for example a bayonet or other profiled structure that a rod can pull against to clamp the tapered end (which will be described in more detail later on).

Figure 5:
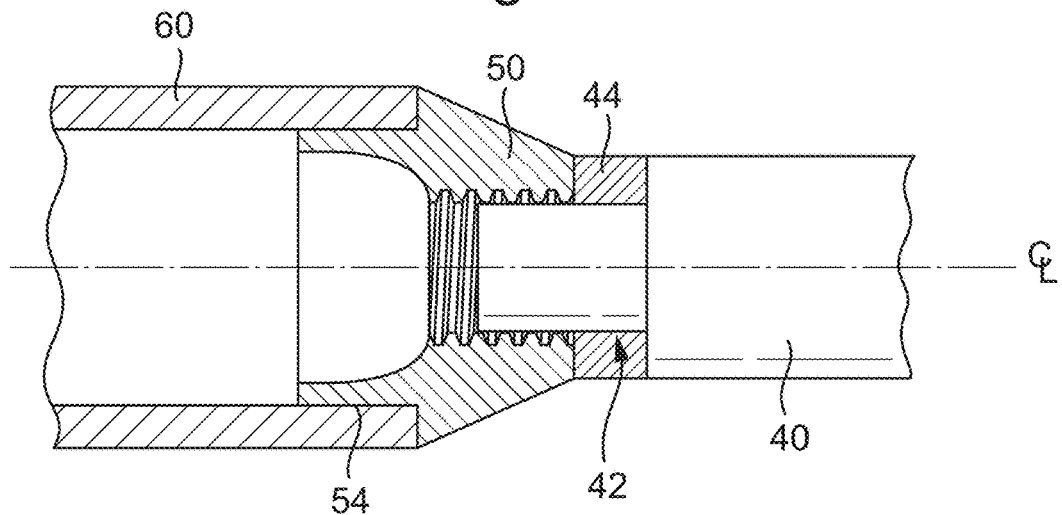
FIG. 5 is the longitudinal cross section of FIG. 4, with a mandrel and a sacrificial annulus of material.

FIG. 5 shows the same workpiece as FIG. 4, but this time with one portion of a mandrel 40 connected to the nut 50. The mandrel 40 has a step 42 in its diameter, such that the section with a smaller diameter fits within the nut 50, whereas the section with a larger diameter does not and instead provides a continuation surface corresponding in diameter to the end of the tapered surface 58 with the smaller diameter. Located at the step 42 is an annulus of sacrificial material 44. This material is later "sacrificed" in order to free the mandrel 40 for further uses.

Figure 6:
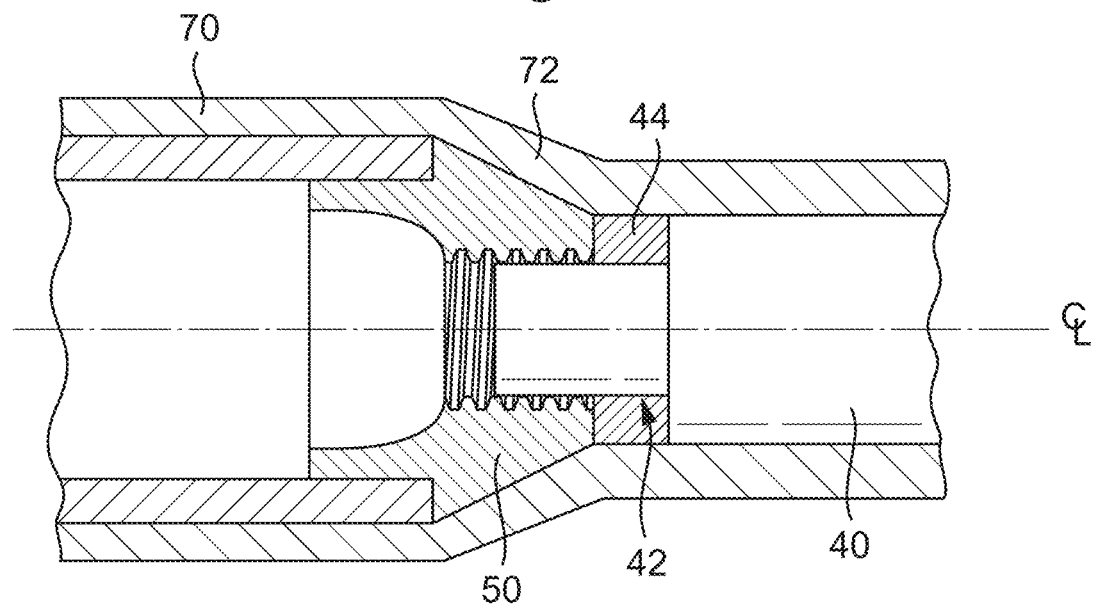
FIG. 6 is the longitudinal cross section of FIG. 5, with filament wound on top.

FIG. 6 depicts an identical configuration to claim 5, but the filament composite layer has been deposited onto the workpiece and mandrel 40 and cured to form the composite member 70. As shown in FIG. 6, the screw thread 52 of the nut 50 is located within the inwardly tapered section 72 of the composite member 70. The nut 50 also has an annular end surface 59 radially aligned with the narrowest part 74 of the inwardly tapered section 72.

The mandrel 40 is freed by cutting through a cross section of the composite tubular structure 200, through the composite layer 70 and the sacrificial annulus of material 44. The annular, cut surface 76 provides the end of the composite member and corresponds to the narrowest part 74 of the inwardly tapered section 72. The inwardly tapered section 72 can be machined or otherwise finished, to achieve the desired surface properties, before a connector is assembled at the end.

Figure 7:
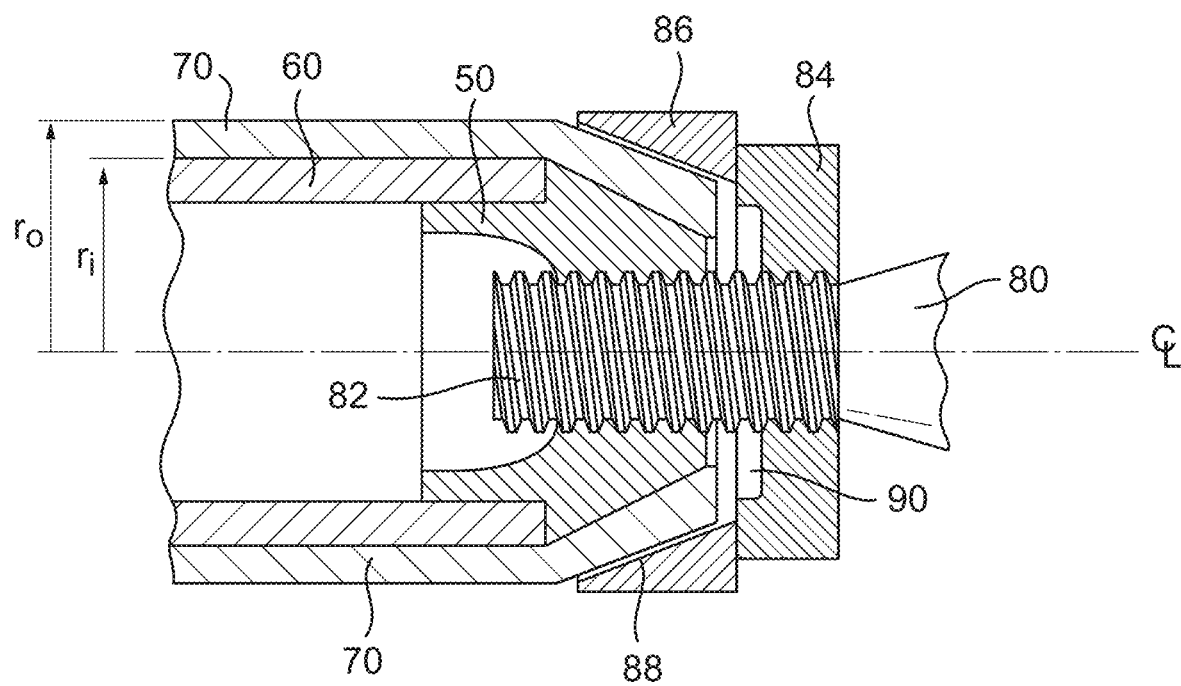
FIG. 7 shows a longitudinal cross section of one end of a composite tubular structure comprising a liner and an embedded nut when connected to a connecting rod.

FIG. 7 shows one end of the finished composite tubular structure 200, where a rod 80 with a screw thread surface 82 has been screwed into the thread 52 of the embedded nut 50. Threaded onto the rod 80 is an external nut 84, followed by an annular wedge 86. The internal sloped surface 88 of the annular wedge 86 matches and mates with the outer surface of the inwardly tapered section 72. The screw thread surface 82 of the rod is connected and screwed into the screw thread surface 52 of the embedded nut 50. By tightening the rod 80 into the embedded nut 50, the sloped surface 88 of the annular wedge 86 is clamped tightly against the inwardly tapered section 72 of the composite member 70, thereby creating a tight connection and bond for transmitting the axial loads and possibly torque.

The through thickness compression can be pre-loaded by adjusting the tightness of the external nut 84, and/or by tightening the connection between the rod 80 and the embedded nut 50. Alternatively a PCD of bolts (shown in FIGS. 9 and 10 and illustrated in FIGS. 1 to 3 of WO 2009/06670 which is incorporated by reference) may be used to drive the annular wedge 86 into the outer surface of the inwardly tapered section 72. A gap 90 is left between the axial end of the tubular structure 200 and the nut 84 in order to prevent weakening of the composite tubular structure 200.

FIG. 8 shows a similar configuration to that of FIG. 7, except that the liner 60 varies in diameter along the axial direction, so that the composite member 70 which is formed around the liner 60 also varies in diameter along the axial direction. Further, the wall thickness of the composite member varies, so that where the composite member 70 has a larger diameter, the wall of the composite member 70 is thinner compared to the wall thickness of the composite member 70 where the composite member 70 has a smaller diameter. Additionally, at the tapered end of the composite member 70 the wall thickness can be seen to increase towards the axial end of the member. Alternatively the wall thickness at the end may be parallel or even reduce in thickness towards the end.

Figure 9B:
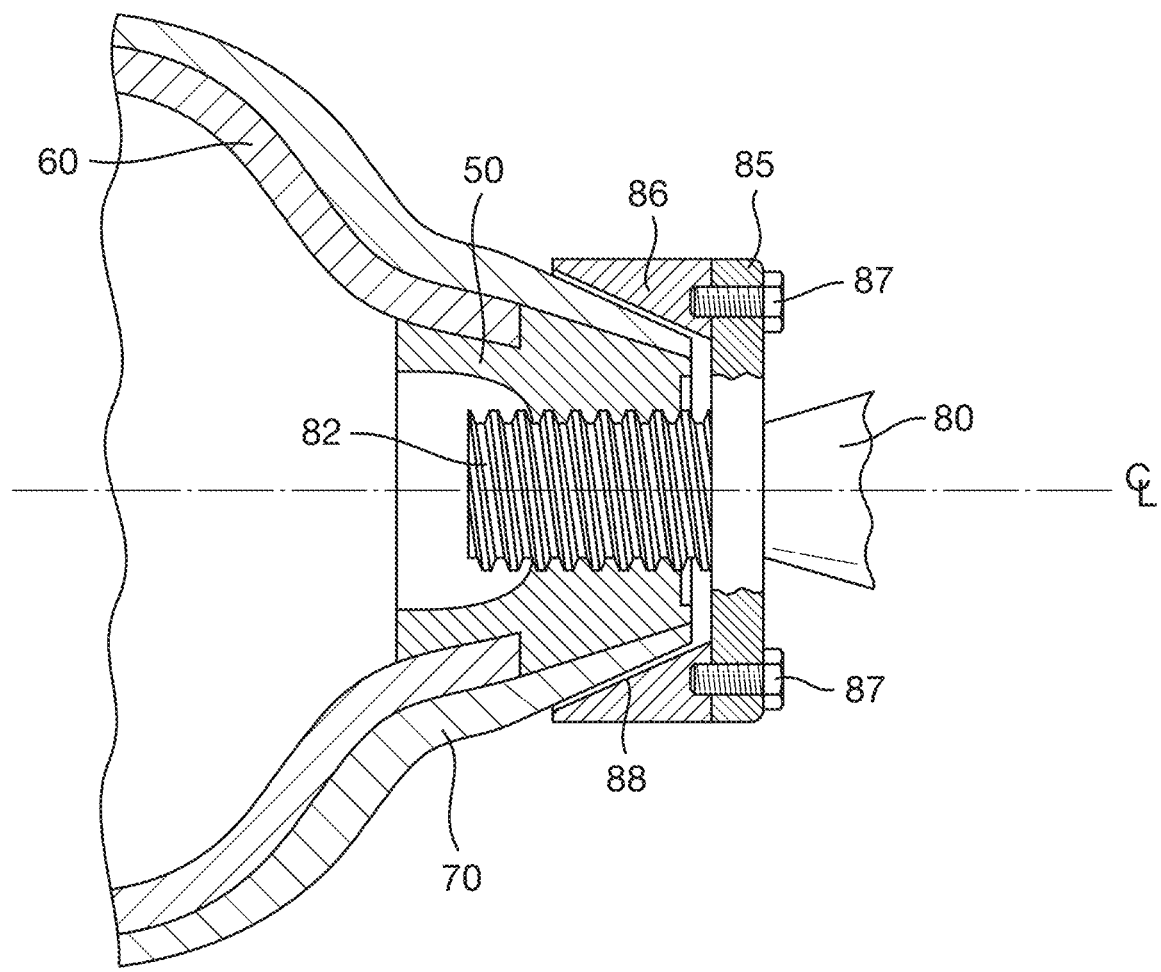
FIG. 9b shows a longitudinal cross-section of a composite tubular structure comprising a liner, illustrating an example of a formation that may be provided at an end of a retained liner, the structure having a taper of reducing wall thickness.

FIGS. 9a and 9b shows a similar configuration to that of FIG. 8, with the exception that there is a flange 85 permanently fixed to the rod 80 instead of the external nut 84. A PCD (Pitch Circle of Diameter) of bolts 87 passes through the flange 85 into contact with the wedge 86. The screw thread 82 of the rod 80 can be tightened into the nut 50 to bring the flange 85 closer or the plurality of bolts 87 can be tightened in turn to set the preload in the connection.

Figure 10A:
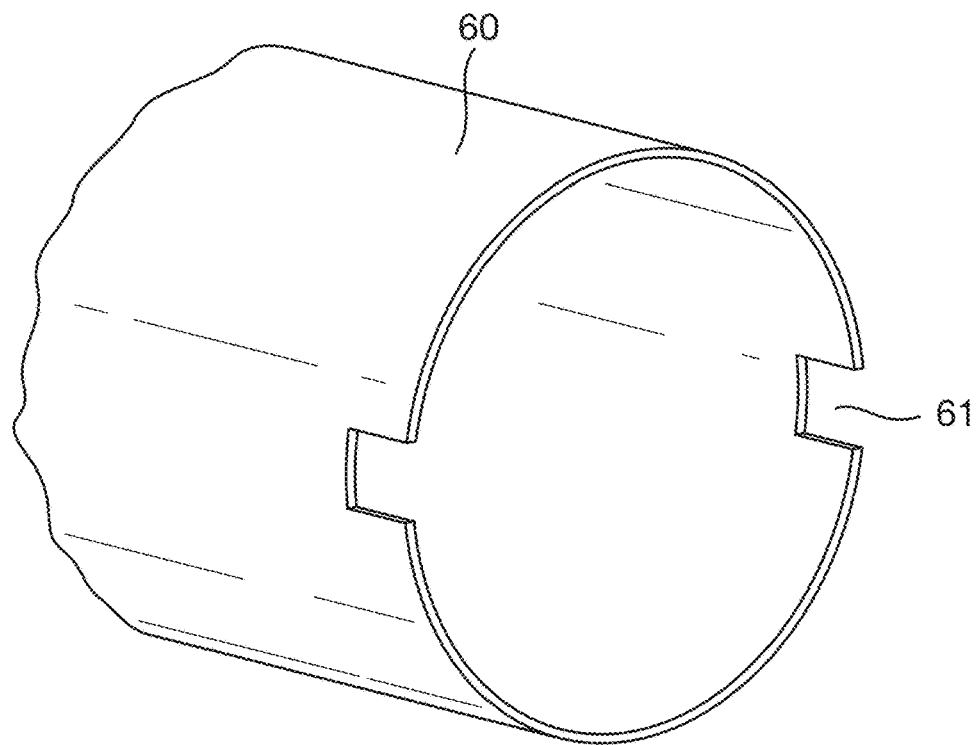
FIG. 10a shows a liner having cutaway portions for interlocking and rotation-resisting engagement with a nut.
Figure 10B:
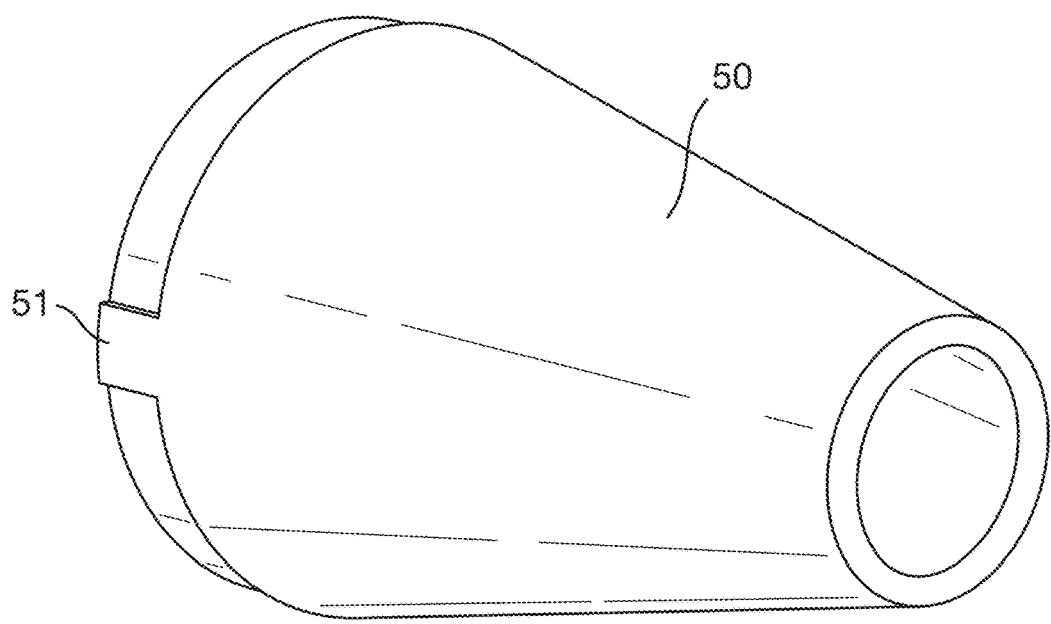

As can be seen in FIG. 8, the wall thickness of the tapered section of the composite member 70 increases towards the tapered end of the composite member 70, i.e., the angle of taper (relative to the axis) of the inner surface is greater than the angle of taper of the outer surface. However, this need not be the case. FIG. 9a shows the composite member 70 having a constant wall thickness at the tapered end, while FIG. 9b shows the wall thickness reducing towards the end of the tapered section of the composite member 70. FIGS. 10a and 10b shown an exemplary embodiment of a liner 60 and nut 50 which have respective axially extending cut-outs 61 and protrusions 51 which are designed to interlock with one another to prevent relative rotation of the liner 60 and nut 50. While two cut-outs are shown (a second protrusions is implicit but not visible in FIG. 10b), it is also possible that there may be just one interlocking cut-out 61 and protrusion 51, or alternatively, there may be a plurality of such interlocking features, for example, 2, 3, 4, 5, 6, 7, 8 or more interlocking features.

Further, although such interlocking features 51, 61 are shown, it is anticipated that there may be other types and/or arrangements of interlocking features, for example, a protrusion may be found on the liner 60 and a recess may be found in the nut 50. There may be more cut-outs or recesses than protrusions to accommodate engagement in different angular positions. There may be a series of male/female features on both parts, e.g., as inter-engaging serrations or castellations.

Since the composite tubular member 70 is clamped between the embedded nut 50 and the annular wedge 86, the connection is particularly suitable for transmitting axial compressive and tensile loads.

The composite tubular structure may be used as a piston rod in a hydraulic actuator. The composite tubular structure may be used as a tie rod or in any other application where a rod undergoes significant tension and/or compression.

When the composite tubular structure is a piston rod, the annular wedge may be a piston head. The connection may therefore form part of a hydraulic actuator comprising a composite piston rod. The composite piston rod may comprise a connection portion towards one end for permitting mechanical connection of the composite piston rod to a piston head. The maximum outer diameter of the composite member and any connection portion of the composite piston rod is equal to, or less than, the diameter of a gland seal which seals around the piston rod during operation of the hydraulic actuator.

The tensioner may be any means that can act to pull the embedded nut into the inwardly tapered section and push the annular wedge onto the inwardly tapered section so as to clamp the inwardly tapered section therebetween. The tensioner may provide a preload on the connection by pulling on the embedded nut whilst pushing on the annular wedge.

The clamping load (preload) may be of greater magnitude than the axial tensile or compressive loads that the system is under and therefore there may be no relative movement between the surfaces of the composite and the embedded nut or annular wedge during use which could cause fretting fatigue failure.

The tensioner may comprise a nut or may comprise one or more secondary bolts (or screws) as shown in FIG. 9, which can exert a force against the annular wedge 86. The secondary bolts may be referred to as compression grab bolts and may extend through an annular flange of a bolt head provided on the rod that engages a thread of the embedded nut. By having a plurality of load means spaced circumferentially around an axial end face of the annular wedge it means that the clamping force (preload) applied between the annular wedge and the embedded nut can be applied evenly and gradually over the circumference.

The tensioner may be designed so that it only exerts a through-force, i.e., a clamping force, on the inwardly tapered section that is clamped between the annular wedge and the embedded nut; it may be designed to leave a recess so that it does not put any direct force on an axial end of the composite material.

The inwardly tapered section of the composite tubular structure may have taper a taper angle of between 5 and 25 degrees to an axis of the structure; it may be between 8 and 15 degrees. For example, the taper angle may be about 10 degrees.

A higher taper angle may be beneficial to reduce length of the connection. However, the higher the taper angle the more difficult it is to manufacture the composite tubular structure. Therefore the taper angle is a trade-off between these two factors. It has been found that a range of 8 to 15 degrees provides a good load transfer whilst being relatively straightforward to manufacture.

It has been found that an arrangement with a composite tubular structure of 1 inch (about 2.5 cm) diameter and an inner and outer diameter taper angle of about 10 degrees it is possible to transmit over 130 kN of load.

An inner taper angle and an outer taper angle of the inwardly tapered section of the composite member may be different.

It has been found that in certain applications the tensile and compressive loads transferred through the composite tubular structure are different. For example, it has been found in certain hydraulic actuators the compressive load can be significantly lower than the tensile load due to the way the cylinder chambers are pressurised. For example, the ratio of tensile load to compressive load may be between 1.5:1 and 5:1, between 2:1 and 4:1 or about 3:1.

During use, inside the connector assembly, axial loads result in hoop and through thickness stresses. By having a composite member with different taper angles on the inner diameter and the outer diameter of the inwardly tapered section the ratio of hoop:through thickness stresses can be tailored to give a joint of maximum strength.

When the tensile load on the composite tubular structure is greater than the compressive load, the connector assembly may be designed so that the outer diameter taper angle is less than the inner diameter taper angle. In this case, at the preloading stage (when the embedded nut 50 and annular wedge 86 have been axially forced in opposite directions to clamp the taper portion) the different angles will result in a greater normal load being transferred through the outer diameter than through the inner diameter of the composite tubular structure. The can result in the composite member being pre-loaded in hoop compression. As a result, when a tensile load is applied in service, the resulting hoop tension will be lower with a larger portion of the load being transferred as through thickness compression.

For example, the ratio of inner diameter taper angle to outer diameter taper angle may be 1.25:1 to 2:1, or about 1.5:1.

Conversely, when the tensile load on the composite tubular structure is expected to be less than the compressive load in use, the connector assembly may be designed so that the outer diameter taper angle is greater than the inner diameter taper angle. In this case, at the preloading stage (when the embedded nut 50 and annular wedge 86 have been axially forced in opposite directions to clamp the taper portion) the different angles will result in a greater normal load being transferred through the inner diameter than through the outer diameter of the composite tubular structure. This can result in the composite member being pre-loaded in through thickness compression.

When the inner diameter taper angle is greater than the outer diameter taper angle, the composite tubular structure may increase in thickness along the inwardly tapered section away from the distal end of the member.

When the inner diameter taper angle is less than the outer diameter taper angle, the composite tubular structure may decrease in thickness along the inwardly tapered section of the composite tubular structure away from the distal end of the member.

The method of making the connector assembly (i.e., the composite tubular structure with a connector) may comprise determining the tensile and compressive forces that are expected to be encountered during service of the connector and designing the composite tubular structure to have a ratio of inner and outer taper angles based on the expected forces to be encountered during service. It may include designing and/or manufacturing the composite tubular structure to have an inner diameter taper angle which is greater than the outer diameter taper angle when the tensile load is expected to be greater than the compressive load during operation; or it may include designing and/or manufacturing the composite tubular structure to have an inner diameter taper angle which is less than the outer diameter taper angle when the tensile load is expected to be less than the compressive load during operation.

The composite tubular structure may have fibre alignment which is uni-directional or multiaxial and may be manufactured by composite stitching, lay-up, filament winding or any other process known for producing tubular composite elements. The composite structure may also be produced from any known fibre and matrix combination. For example, the composite tubular structure may have carbon or glass for the fibre, and may have thermoset or thermoplastic polymers for the matrix. The material of the connector may be determined by the nature and magnitude of the desired load case and environmental conditions.

The connector components, such as the embedded nut 50, annular wedge 86, tensioner(s) etc. may be made of metal. For example, one or more of these components may be made of stainless steel.

The invention claimed is:
1. A composite tubular structure comprising:
an elongate composite member having:
a first end and a second end;
a first inwardly tapered section adjacent the first end;
a second inwardly tapered section adjacent the second end;
a main body portion extending from the first inwardly tapered section to the second inwardly tapered section; and
a first nut and a second nut for forming connections with other components, the first nut being retained in the first end by being embedded within the first inwardly tapered section, and the second nut being retained in the second end by being embedded within the second tapered section;
wherein the first inwardly tapered section has a first inner surface which follows a first tapered outer surface of the first nut, the first inwardly tapered section narrowing the elongate composite member in a first longitudinal direction towards the first end so as to provide a first constriction which retains the first nut within the elongate composite member;

wherein the second inwardly tapered section has a second inner surface which follows a second tapered outer surface of the second nut, the second inwardly tapered section narrowing the elongate composite member in a second longitudinal direction towards the second end so as to provide a second constriction which retains the second nut within the elongate composite member; and wherein the main body portion of the elongate composite member is of constant internal radius between the first inwardly tapered section and the second inwardly tapered section.

2. The composite tubular structure as claimed in claim 1, wherein the composite tubular structure includes a connector comprising a rod engaging the first nut, the engagement occurring within the first inwardly tapered section, an annular wedge configured to urge against an outer surface of the first inwardly tapered section, and a tensioner provided to exert a clamping force on the first inwardly tapered section via the annular wedge.

3. The composite tubular structure as claimed in claim 1, wherein the first and second inwardly tapered sections each have a taper angle of between 5 to 25° to an axis of the composite tubular structure.

4. The composite tubular structure as claimed in claim 1, further comprising a liner within the composite member.

5. The composite tubular structure as claimed in claim 4, wherein the liner is retained and remains intact within the elongate composite member during service.

6. The composite tubular structure as claimed in claim 4, wherein the liner is one or more of impervious to fluid or electrically conductive.

7. A method for manufacturing the composite tubular structure of claim 1, comprising:
attaching the first nut to a first axial end of a liner and a second nut to a second axial end of the liner to provide a surface for depositing filaments over, the first nut being arranged so that the first tapered outer surface tapers in a first direction away from the liner and the second nut being arranged so that the second tapered outer surface tapers in a second direction opposite to the first direction away from the liner;
depositing filaments around the liner and the attached first and second nuts to form the elongate composite member having the main body portion and the first inwardly tapered section at the first end and the second inwardly tapered section at the second end, such that the first inwardly tapered section has an inner surface which follows the tapered outer surface of the nut.

8. The method as claimed in claim 7, wherein the liner is subsequently retained within the composite tubular structure.

9. The method as claimed in claim 7, wherein the liner is subsequently removed from within composite the tubular structure by melting, dissolving, burning, peeling, unraveling, fragmentation, UV degradation or another removal process.

10. The method as claimed in claim 7, wherein the method comprises pressurising the liner during a winding and/or forming and/or curing operation, and/or in subsequent service of the composite tubular structure.

11. The method of claim 7, wherein the step of depositing filaments comprises a filament winding process.

12. The method of claim 11, wherein a winding angle of the filaments is varied to take account of variations in the internal radius of the composite member.

13. The method of claim 7, wherein the liner is supported between two parts of a mandrel while the filament deposition is taking place.

14. The method as claimed in claim 13, wherein the two parts of the mandrel each screw into the first and second nuts of the composite tubular structure to seal internal threads of the first and second nuts during the filament deposition process.

15. The method of claim 13, wherein each part of the mandrel further comprises:
an inward radial step, such that a portion of the mandrel has a larger diameter and a portion of the mandrel has a smaller diameter; and
an annular sacrificial layer of material disposed about a part of the smaller diameter portion of the mandrel;
wherein once the winding has been completed and the mandrel is to be removed, a cut is made in a radially inward direction through the composite member and the sacrificial material layer, and the mandrel and any excess filament windings are removed.

16. A composite tubular structure comprising:
an elongate composite member including:
a first end and a second end;
a first inwardly tapered section adjacent the first end;
a second inwardly tapered section adjacent the second end;
a main body portion extending from the first inwardly tapered section to the second inwardly tapered section; and
a first nut and a second nut for forming connections with other components, the first nut being retained in the first end by being embedded within the first tapered section, and the second nut being retained in the second end by being embedded within the second tapered section;
wherein the first inwardly tapered section has a first inner surface which follows a first tapered outer surface of the first nut, the first inwardly tapered section narrowing the elongate composite member in a first longitudinal direction towards the first end so as to provide a first constriction which retains the first nut within the elongate composite member;
wherein the second inwardly tapered section has a second inner surface which follows a second tapered outer surface of the second nut, the second inwardly tapered section narrowing the elongate composite member in a second longitudinal direction towards the second end so as to provide a second constriction which retains the second nut within the elongate composite member; and
wherein an internal radius of the main body portion varies by increasing toward a middle of the elongate composite member from the first end and from the second end of the elongate composite member.

17. The composite tubular structure as claimed in claim 16, wherein a wall thickness of the composite member is varied such that the composite member has a thinner wall where the internal radius of the tubular structure is larger compared to a thicker wall where the radius of the tubular structure is smaller.

18. The composite tubular structure as claimed in claim 16, wherein the composite tubular structure includes a connector comprising a rod engaging the first nut, the engagement occurring within the first inwardly tapered section, an annular wedge configured to urge against an outer surface of the first inwardly tapered section, and a tensioner provided to exert a clamping force on the first inwardly tapered section via the annular wedge.

19. The composite tubular structure as claimed in claim 16, wherein the first and second inwardly tapered sections each have a taper angle of between 5 to 25° to an axis of the composite tubular structure.

* * * * *